Feb. 27, 1962 C. E. WATSON ET AL 3,022,843
AUTOMATIC LOT WEIGHING MACHINES
Filed April 19, 1960 2 Sheets-Sheet 1

INVENTORS
Clyde E. Watson and
Harold Watson
BY
Scott L. Norviel
Atty.

Feb. 27, 1962 C. E. WATSON ET AL 3,022,843
AUTOMATIC LOT WEIGHING MACHINES
Filed April 19, 1960 2 Sheets-Sheet 2

INVENTOR.
Clyde E. Watson and
Harold Watson
BY Scott L. Nowrie
atty

United States Patent Office 3,022,843
Patented Feb. 27, 1962

3,022,843
AUTOMATIC LOT WEIGHING MACHINES
Clyde E. Watson, 4742 W. Mitchell Drive, and Harold Watson, 6102 N. 14th St., both of Phoenix, Ariz.
Filed Apr. 19, 1960, Ser. No. 23,292
4 Claims. (Cl. 177—98)

This invention concerns automatic weighing machines of the type wherein flowable materials may be automatically separated into lots having equal predetermined weights.

One of the objects of the invention is to provide a machine wherein the material is caused to flow on a slanted surface from a storage hopper to a weighing compartment and thence to delivery hoppers with a minimum of dropping.

Another object is to provide a means for moving materials to be weighed by flowing the material from a receiving hopper over slanting plates to weighing containers and thence to a delivery chute with a minimum amount of fall through the air.

Still another object of the device is to provide a weighing machine wherein the flow of material from the storage part of the machine to the weighing part of the machine is controlled by gates and cutoff hoppers that have mechanical movements not dependent upon the weight or flow of material; said cutoff devices being operated from independent power sources.

Still another object of the invention is to provide a lot weighing machine which has weighing controls which can be quickly and easily adjusted and which are visible from the front or operating side of the machine.

Still another object is to provide a weighing machine of the class stated having a weighing beam which is operated by weights and is not controlled by spring tensions.

Still another object is to provide a weighing machine wherein the weights of the lots of the material are controlled by weights which are stationary relative to the machine supports and do not depend upon a rolling or moving ball to produce the actions required to open or close the material flow gates and/or shut off the flow of material at predetermined times.

We attain the foregoing objects by means of the parts, combinations of parts and devices shown in the accompanying drawings, in which—

Similar numerals refer to similar parts in the several views.

Figure 2:
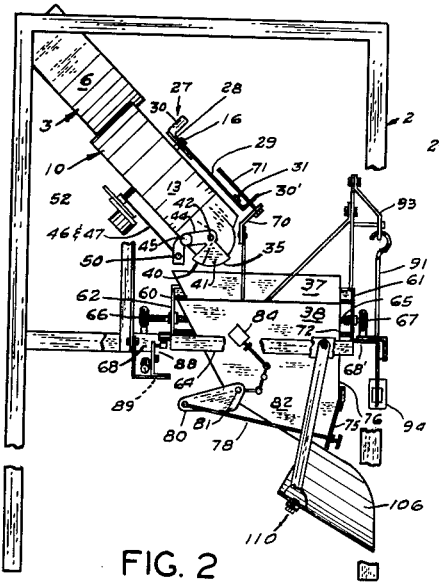
FIGURE 2 is a side view thereof with certain parts broken away to show details of the parts.

Operating and weight parts of the machine, here illustrated, are contained within and supported by the frame 2.

Within this frame, and disposed on the left or outside portion of frame 2 there is a receiving chute 3 (see FIGURE 2), which has a flat bottom plate 4 and sides 6 and 7, and is supported at a predetermined downwardly trending angle which is sufficient to keep any materials to be weighed by the machine flowing downward and toward the front of the frame, where they will drop from the lower edge 5, of chute 3.

Below the edge 5 of chute 3 there is a receiving and diverting chute 10. This has a slanting bottom plate 12 with arcuate upstanding edge plates 13 and 14 extending along its side edges to guide and direct the material to be weighed.

Material from said chute 3 is divided and directed by chute 10 and by a pivotally mounted diverting baffle 15. This baffle is composed of a thin metal plate 18 which extends upward from a semi-circular apron 19. This baffle assembly is supported on shaft 16. Apron 19 travels over the upper face of bottom plate 12. Swinging motion of this baffle is provided by the action of horn 27 and this is, in turn, governed by the action of balancing beam 60 through vertical member 70 and rod 71.

Shaft 16 is journalled in plate 12 and extends upward from the plate at right angles to its face. Baffle 15 tilts from side to side in front of the discharge end of chute 3 above its edge 5, and directs the flow of material alternately to the left and right sides of diverter chute 10. This motion is stopped at the ends of each tilting motion by contact of the ends of plate 15 with the lower ends 20 and 21 of the inwardly curving sides 6 and 7 of chute 3.

In the mid portion of bottom 12 of the dividing chute 10 there are inner edge plates 23 and 24 which direct the flow of material entering the upper end of this chute into either of two portions which flow outward and downward through the laterally positioned chutes 25 or 26.

On the upper end of shaft 16 there is a double horn piece 27. This is centrally mounted on shaft 16 and has radially outwardly and downwardly extending balancing and contacting arms 28 and 29. These arms have upwardly extending contact fingers at their ends. The horn piece 27 is keyed to shaft 16 (which may be termed the splitter shaft) and moves this shaft and diverter baffle 15 according to right or left tilted positions. Weights 31 are added to the ends of arms 28 and 29, as desired and the whole of this sub-assembly is balanced so that the arms are somewhat top heavy, relative to the axis of shaft 16. That is, the center of gravity is below the axis of shaft 16 when the horn piece is tilted either to the left or to the right of the axis of shaft 16. This means that the baffle 15 normally rests and tilts either to the left or right of the outlet of chute 3.

Figure 6:
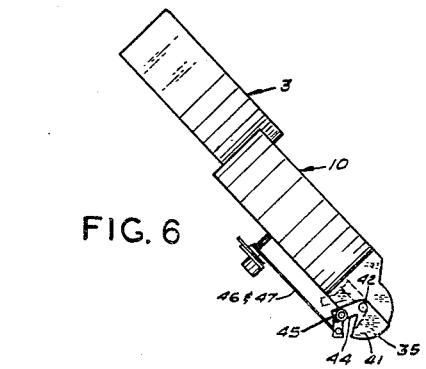
FIGURE 6 is a side elevational view of the parts shown in FIGURE 4.
Figure 7:
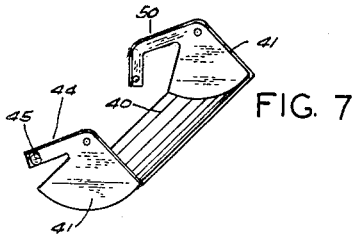
FIGURE 7 is a perspective view of a chute cutoff device.
Figure 3:
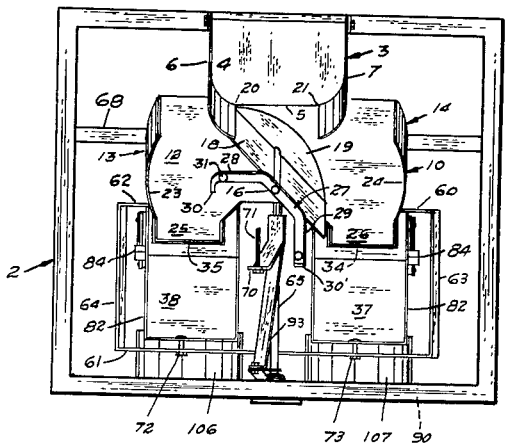
FIGURE 3 is a plan view of the main chute and weighing chutes.
Figure 12:
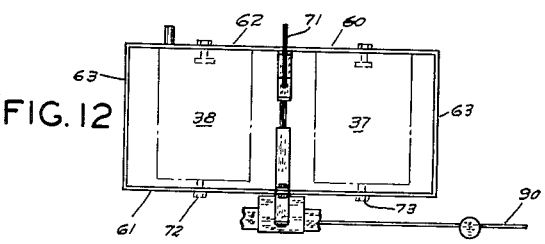
FIGURE 12 is a plan view of the balance frame.
Figure 11:
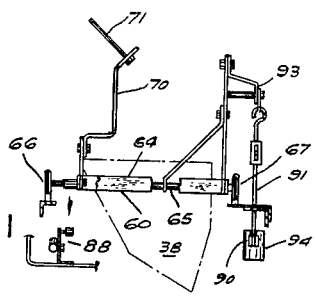
FIGURE 11 is a side elevational view of the weighing mechanism shown in FIGURE 8.
Figure 8:
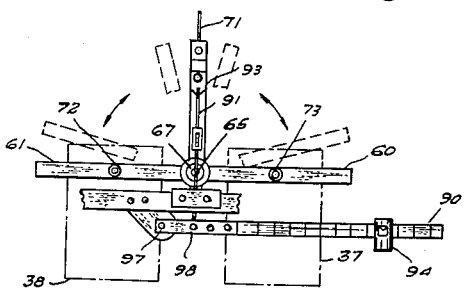
FIGURE 8 is a front elevational view of the weighing mechanism.

The lower ends of chutes 25 and 26 are provided with pivotally mounted cutoff gates 34 and 35 which swing from a raised or closed position, as shown in FIGURE 2, to a lowered or open position, as shown by dotted lines in FIGURES 2 and 6. The ends of these chutes are disposed over weighing containers 37 and 38 so that any material released from them will drop directly into the respective containers.

The cut off gates 34 and 35 have rounded bottoms 40 closed by end pieces 41. They are pivoted on pins 42 and 43 which extend through holes in the end pieces and into the sides of the chutes 25 and 26 near the lower ends of the sides. The outer side piece in each gate has a rearward extension arm 44 which carries a weight 45 to counterbalance the weight of the bottom of the gate. Each gate normally pivots to closed position as shown by the solid lines in FIGURES 2 and 6. The gates are pulled to open position by the action of chains 46 and 47 which extend between fastening points 48 and 49 in the ear ends of rearwardly extending operating arms 50 and 50', cross and are then attached to the ends of a cross arm 52 keyed on the bottom end portion of shaft 16. This arrangement causes gate 34 on the right chute 26 to open when baffle 15 is tilted, with its top tilted to the left, so that material directed to the right to chute 26 will fall from the bottom of this chute directly into weighing container 37. Conversely, when baffle 15 is tilted to the right, material is diverted to the left and the left hand gate 35 is lowered to open position, and the material falls into container 38.

Weighing containers 37 and 38 are swingably mounted in the end portions of balance frame 60. This frame is composed of two parallel balance members 61 and 62 joined at the ends by cross members 63. These parts form a rectangular frame which is supported at the point of balance on shaft 65, which extends fore and aft and is journalled in bearings 66 and 67 on transverse frame members 68 and 68'. On the forward end of shaft 65 there is a balance indicating arm 70 which extends upward from the center of beam frame outer member 61. This indicating arm carries a balance operating rod 71 which contacts the fingers 30 and 30' on the ends of horn piece 27, and move it right or left according to the right or left tilt of the balancing frame.

The weighing containers 37 and 38 are pivotally supported in the balance beam frame on pivot pins 72 and 73, so that they always hang vertically regardless of the tilt of the balancing frame.

The containers are left and right counter-parts and have trap type release doors 75 on their bottoms. These doors are hinged at the top to the respective front plates 76 of the containers, and when in closed position hang at rearward slanting angles. They are normally kept in closed position by pull rods 78 which connect them to lever plates 80, pivotally supported at 81 to the outer side plates 82 of each container, respectively. Linkage 81 connects the lever plates 80 to the armature 83 of solenoids 84 supported on the outer side plates 82 of each of the containers. During operation of the weighing machine the solenoids 84 are energized when the containers are being filled. After filling, and when they descend to the low tilted position they are emptied by cutting off the energizing current and allowing the rear ends of lever plates 80 to descend so that rods 78 push doors 75 open, successively.

Current to the solenoids may be supplied from 110 volt power lines 87 and the current turned on and off by tilting mercury switches 88 and 89 which are disposed on frame 60 so that the electricity is cut off from each solenoid successively as the container to which it is attached moves to the lowered filling position after weighing. Conversely as the containers raise, successively, the switches on the ends of frame 60 close the circuits through their respective solenoids and close the respective doors 75.

Figure 10:
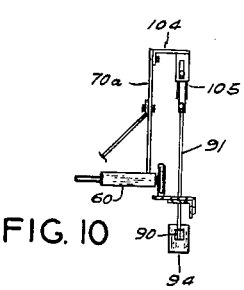
FIGURE 10 is a side elevational view of the weighing mechanism shown in FIGURE 9.
Figure 9:
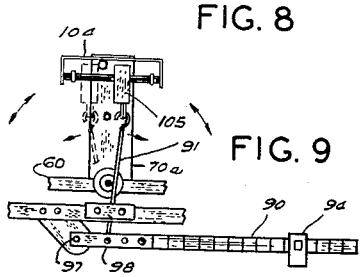
FIGURE 9 is a front elevational view of a modified form of weighing mechanism.

Weighing is accomplished by the lifting movement of balance beam 90. The point of balance between the two containers 37 and 38 is determined by the lifting of the balance beam 90 by the balance beam operating rod 91. This rod is pivoted on beam 90 at a point 98 to the right of the beam pivot 97 which is positioned somewhat to the left of the dead center position of the center of the balance shaft on which the frame 60 rests. Extending upward from the center of the forward member of the frame is a vertical balance member 70. As the frame tilts from side to side this vertical member also swings or tilts and carries rod 71 with it. As the member 70 reaches the highest point in its arcuate travel it lifts the beam 90. This point of lift determines the point of balance and the weight 94, which may be moved along balance beam 90, determines the weight necessary to tip the frame 60 from side to side and lift the beam. For normal weighing the upper end of rod 91 is hooked directly into a bracket 93 at the top of the member 70. For handling greater loads the frame 104, shown in FIGURES 9 and 10, is attached to the upper end of the vertical member 70a. This permits the point from which the rod 91 is connected to the vertical member to shift from the right or left according to the tilt of the frame 60 and member 70a. When the runner 105 is shifted from the center, as shown in FIGURE 9, then the power necessary to tilt the frame is multiplied according to the degree of off center position of the runner 105. This is because it takes more power to lift the beam 90 with the rod 91 when the point of lift is not directly aligned with the center of the member 70.

Figure 1:
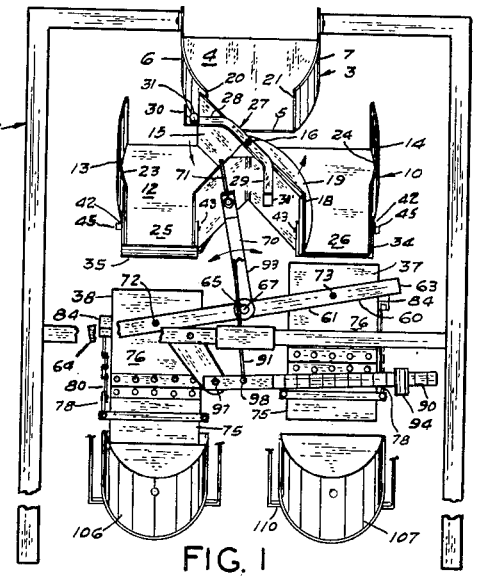
FIGURE 1 is a front elevational view of a lot weighing machine incorporating our improvements.
Figure 5:
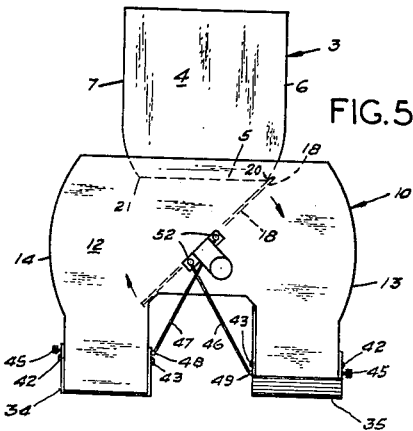
FIGURE 5 is a bottom view of said chutes.
Figure 4:
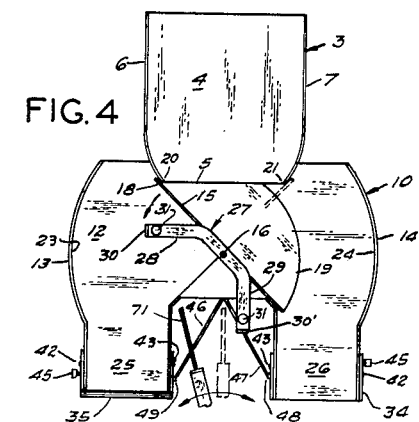
FIGURE 4 is a plan view of the delivery and dividing chutes.

After the material has been dropped into a weighing container and the point of cutoff has been determined and the frame 60 has moved to the next successive tilted position, and the gate at the bottom of the filled container opened, the material is dropped into the delivery chute 106 or 107, as the case may be. This material is then deposited in bags or boxes as desired. The delivery chutes are pivotally mounted beneath the gates of the containers to receive the material in the most efficient manner and the chutes are pivoted so that the material may be directed to the right or left or toward the center, as desired by the user. The hinges and pivoting supports are shown at 110 FIGURES 1 and 2.

The diverter assembly that includes the plate 18 and apron 19 is advantageous in that it diverts and directs material passing through chute 3 and causes it to flow into either of the chute portions 25 and 26 of chute 10. In moving from side to side it at no time causes the material to jam or hit the upwardly directed edge of the plate 18. The plate is always behind the sides 6 or 7 of chute 3 at the upper end. In addition to this the apron 19 lies underneath the lower end 5 of chute 3 and there is no chance for material to get under the apron or under the lower edge of plate 18. Therefore, its action in diverting the material is clean and unimpeded. Note that the supporting shaft 16 is attached to the middle of plate 18 and extends across it in an upward direction at right angles to its length. This joint may be brazed or welded according to the best practices with the material used. The horn 27 may be brazed or keyed to the upper end of shaft 16 and the cross arm 52 at the lower end of shaft 16 may be attached by bolts or a sleeve and set screw or otherwise by brazing or welding.

It is also to be understood that whereas the drawing shows the slant of the chutes 3 and 10 at approximately forty five degrees from the vertical, this slant may be varied as desired and according to the material handled. Accordingly the points of attachment of the chutes to frame 2 may be made variable and easily adjusted.

We claim:
1. A weighing machine for weighing lots of flowable material automatically and rapidly comprising
   a supporting frame, having a back and a front, a forwardly and downwardly inclined inlet chute having a flat bottom and upstanding side edges; a slanting diverting chute having a single channel inlet end disposed to receive material from said inlet chute and having a flat bottom and upstanding side edge plates and centrally disposed splitter baffles dividing the lower end portion of the chute into right and left chute parts; cut off gates closing the lower ends of said right and left chute parts alternately; a diverter plate shaft operably disposed in said slanting diverting chute forward of the splitter baffles; a pivotally mounted diverter baffle plate disposed in said diverting chute and operating on said shaft below the open lower end of said inlet chute by swinging from side to side to alternately divert material flowing from said inlet chute into either of said right and left diverter chute parts while simultaneously closing the inlet chute from the opposite diverter chute; mechanism interconnecting said diverter baffle plate shaft and said cutoff gates arranged so that the gate at the lower end of the chute into which material is being diverted will be open when material is being diverted into said chute and conversely the gate into which material is not being diverted will be closed; a balancing frame pivotally mounted in said supporting frame below the lower ends of the right and left chute parts of said diverter chute; weighing containers, pivotally supported in said balancing frame and hanging vertically below the lower ends of each of said right and left chutes respectively, and disposed to receive material from said chutes; release doors in the bottoms of said weighing containers; mechanism including latch releasing solenoids operated by tilt switches on said balancing beam to release material held in each of said containers when either container moves downward, after balancing; pivotally mounted delivery chutes disposed below the release doors of said weighing containers, a centrally positioned upwardly extending balance member on said balance frame, havings its upper end portion disposed to move in a double horn piece on said diverter plate shaft, having downwardly extending contact arms with upwardly extending fingers on their ends; an arcuate path; an upwardly and rearwardly extending finger on said upwardly extending balance member adapted to engage either finger on said horn contacting arms to move said baffle plate to angular positions according to the tilted position of said balancing frame; a weighing beam disposed below said balance frame, pivoted at one end, at a point off center relative to the center of said balance frame and provided with a sliding weight on its free end; and an operating rod connecting the weighing beam at a point below the center of the balance frame, to the end of the upwardly extending balance member disposed to lift said weighing beam when said balancing frame moves to a horizontal balancing position and said upwardly extending member moves to the highest point of its arcuate travel.

2. The weighing mechanism as described in claim 1, wherein the diverter baffle is mounted on and keyed to a shaft journalled in the bottom plate of the diverter chute, a horn having upstanding fingers at its ends, keyed to the upper end of said shaft and disposed so that said fingers will be contacted by the finger on the upwardly extending balance member of said balance frame, so that tilting motion of said balance frame will vary the angular position of said diverter baffle.

3. In the mechanism of the weighing device described in claim 1, the combination of means for opening and closing the release doors in the bottom of said weighing containers, composed of a weighted lever plate pivoted to a side plate of each of said containers, and weighted to normally hold the door open, an electro magnetic solenoid connected by linkage to said door to hold the door closed when the solenoid is energized, an electric circuit, including a source of power controlled by a tilting mercury switch disposed on the balancing frame and arranged so that when the end of the frame, on which the container is pivotally supported, is raised, the circuit through the solenoid is closed and the solenoid is energized to hold said door closed.

4. In an automatic lot weighing machine as described in claim 1 herein, a diverting baffle composed of an upright metal plate, a semi-circular apron extending at right angles to said plate and projecting from the lower edge of said plate, a supporting shaft attached to the center of plate and extending downward through the bottom plate of said diverter chute, and upward above the upper edge of said plate, a double horn attached to the upper end of said shaft having upwardly extending fingers at each end to derive motion from the rod finger on the upper end of the balance indicating arm on the balance frame, and a cross arm at the lower end of said shaft to communicate motion to the cutoff gates at the lower ends of the diverting chute; said baffle being disposed below the outlet end of the inlet chute and said apron being disposed to operate below the lower end of said inlet chute.

References Cited in the file of this patent

UNITED STATES PATENTS

| | | |
|---|---|---|
| 555,393 | Nickerson | Feb. 25, 1896 |
| 941,725 | Neureuther | Nov. 30, 1909 |
| 953,127 | Dunkerly | Mar. 29, 1910 |
| 1,568,444 | De Vries | Jan. 5, 1926 |
| 1,849,256 | Trovaton | Mar. 15, 1932 |